US009171318B2

(12) United States Patent
Ruiz-Velasco et al.

(10) Patent No.: US 9,171,318 B2
(45) Date of Patent: Oct. 27, 2015

(54) VIRTUAL INSERTION OF ADVERTISEMENTS

(75) Inventors: Enrique Ruiz-Velasco, Flower Mound, TX (US); Binny Asarikuniyil, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 743 days.

(21) Appl. No.: 12/946,207

(22) Filed: Nov. 15, 2010

(65) Prior Publication Data

US 2012/0124618 A1 May 17, 2012

(51) Int. Cl.
*H04N 7/10* (2006.01)
*G06Q 30/02* (2012.01)
*H04N 21/262* (2011.01)
*H04N 21/482* (2011.01)
*H04N 21/81* (2011.01)
*H04N 21/845* (2011.01)

(52) U.S. Cl.
CPC ........ *G06Q 30/0241* (2013.01); *G06Q 30/0276* (2013.01); *G06Q 30/0277* (2013.01); *H04N 21/26258* (2013.01); *H04N 21/4825* (2013.01); *H04N 21/812* (2013.01); *H04N 21/8456* (2013.01)

(58) Field of Classification Search
CPC .................. H04N 21/25883; H04N 21/25891; H04N 21/4532; H04N 21/458; H04N 21/44222; H04N 21/4621; H04N 21/812; H04L 29/06455
USPC .......................................................... 725/32
See application file for complete search history.

(56) References Cited

U.S. PATENT DOCUMENTS

| 5,838,314 | A | * | 11/1998 | Neel et al. ......................... 725/8 |
| 7,457,852 | B2 | * | 11/2008 | O'Rourke et al. ............. 709/219 |
| 7,546,619 | B2 | * | 6/2009 | Anderson et al. ................ 725/35 |
| 7,797,441 | B1 | * | 9/2010 | Barnes et al. .................. 709/231 |
| 7,992,161 | B2 | * | 8/2011 | Meadows et al. ................ 725/23 |
| 8,024,766 | B2 | * | 9/2011 | Addington ..................... 725/116 |
| 8,065,703 | B2 | * | 11/2011 | Wilson et al. ................... 725/34 |
| 8,108,895 | B2 | * | 1/2012 | Anderson et al. ................ 725/36 |
| 8,214,518 | B1 | * | 7/2012 | Bertz ............................ 709/231 |
| 8,272,009 | B2 | * | 9/2012 | Downey et al. ................. 725/32 |
| 8,713,603 | B2 | * | 4/2014 | Kilar et al. ....................... 725/34 |
| 2001/0028662 | A1 | * | 10/2001 | Hunt et al. ..................... 370/487 |
| 2002/0162106 | A1 | * | 10/2002 | Pickover et al. ................ 725/42 |
| 2003/0009452 | A1 | * | 1/2003 | O'Rourke et al. ................. 707/3 |
| 2003/0018966 | A1 | * | 1/2003 | Cook et al. ......................... 725/2 |
| 2003/0149618 | A1 | * | 8/2003 | Sender et al. ................... 705/14 |
| 2003/0149975 | A1 | * | 8/2003 | Eldering et al. ................ 725/34 |

(Continued)

OTHER PUBLICATIONS

U.S. Appl. No. 61/398,259.*

(Continued)

*Primary Examiner* — Nasser Goodarzi
*Assistant Examiner* — Michael B Pierorazio

(57) ABSTRACT

A device includes a communication interface and one or more processors. The communication interface may receive a playlist that lists segments of a content stream in an order the segments are to be recombined, receive advertisement information that describes an advertisement, receive a breakpoint, and send a revised playlist to a remote server. The one or more processors may generate the revised playlist based on the playlist, the advertisement information, and the breakpoint. The revised playlist may include references to the segments and the advertisements.

30 Claims, 10 Drawing Sheets

(56) References Cited

U.S. PATENT DOCUMENTS

| | | | |
|---|---|---|---|
| 2003/0217170 A1* | 11/2003 | Nelson et al. | 709/231 |
| 2004/0019497 A1* | 1/2004 | Volk et al. | 705/1 |
| 2004/0025185 A1* | 2/2004 | Goci et al. | 725/92 |
| 2004/0255322 A1* | 12/2004 | Meadows et al. | 725/23 |
| 2005/0132398 A1* | 6/2005 | Baran et al. | 725/28 |
| 2006/0080167 A1* | 4/2006 | Chen et al. | 705/14 |
| 2006/0212442 A1* | 9/2006 | Conrad et al. | 707/5 |
| 2006/0212444 A1* | 9/2006 | Handman et al. | 707/5 |
| 2006/0287915 A1* | 12/2006 | Boulet et al. | 705/14 |
| 2006/0293954 A1* | 12/2006 | Anderson et al. | 705/14 |
| 2006/0293955 A1* | 12/2006 | Wilson et al. | 705/14 |
| 2007/0022032 A1* | 1/2007 | Anderson et al. | 705/35 |
| 2007/0055985 A1* | 3/2007 | Schiller et al. | 725/34 |
| 2007/0204310 A1* | 8/2007 | Hua et al. | 725/88 |
| 2007/0261072 A1* | 11/2007 | Boulet et al. | 725/14 |
| 2007/0288950 A1* | 12/2007 | Downey et al. | 725/9 |
| 2007/0288953 A1* | 12/2007 | Sheeman et al. | 725/34 |
| 2008/0115161 A1* | 5/2008 | Kurzion | 725/32 |
| 2008/0187279 A1* | 8/2008 | Gilley et al. | 386/52 |
| 2008/0189735 A1* | 8/2008 | Barton et al. | 725/32 |
| 2008/0216107 A1* | 9/2008 | Downey et al. | 725/22 |
| 2008/0221986 A1* | 9/2008 | Soicher et al. | 705/14 |
| 2008/0276271 A1* | 11/2008 | Anderson et al. | 725/34 |
| 2008/0319844 A1* | 12/2008 | Hua et al. | 705/14 |
| 2009/0019374 A1* | 1/2009 | Logan et al. | 715/753 |
| 2009/0079871 A1* | 3/2009 | Hua et al. | 348/584 |
| 2009/0150941 A1* | 6/2009 | Riedl et al. | 725/61 |
| 2009/0171787 A1* | 7/2009 | Mei et al. | 705/14 |
| 2009/0187939 A1* | 7/2009 | Lajoie | 725/34 |
| 2009/0210899 A1* | 8/2009 | Lawrence-Apfelbaum et al. | 725/34 |
| 2009/0217316 A1* | 8/2009 | Gupta | 725/32 |
| 2009/0259551 A1* | 10/2009 | Chenard et al. | 705/14.55 |
| 2009/0259552 A1* | 10/2009 | Chenard et al. | 705/14.72 |
| 2010/0037253 A1* | 2/2010 | Sheehan et al. | 725/31 |
| 2010/0082635 A1* | 4/2010 | Elsner et al. | 707/741 |
| 2010/0083305 A1* | 4/2010 | Acharya et al. | 725/34 |
| 2010/0138290 A1* | 6/2010 | Zschocke et al. | 705/14.41 |
| 2010/0146542 A1* | 6/2010 | Weihs et al. | 725/34 |
| 2010/0169459 A1* | 7/2010 | Biderman et al. | 709/219 |
| 2010/0228591 A1* | 9/2010 | Therani et al. | 705/10 |
| 2010/0228592 A1* | 9/2010 | Anderson et al. | 705/10 |
| 2010/0242079 A1* | 9/2010 | Riedl et al. | 725/115 |
| 2010/0272419 A1* | 10/2010 | Wang et al. | 386/124 |
| 2011/0016479 A1* | 1/2011 | Tidwell et al. | 725/9 |
| 2011/0022589 A1* | 1/2011 | Bauer et al. | 707/723 |
| 2011/0072105 A1* | 3/2011 | Biderman et al. | 709/217 |
| 2011/0072450 A1* | 3/2011 | Kokernak et al. | 725/23 |
| 2011/0145858 A1* | 6/2011 | Philpott et al. | 725/32 |
| 2011/0191439 A1* | 8/2011 | Dazzi et al. | 709/217 |
| 2011/0191445 A1* | 8/2011 | Dazzi | 709/219 |
| 2011/0191446 A1* | 8/2011 | Dazzi et al. | 709/219 |
| 2011/0191447 A1* | 8/2011 | Dazzi et al. | 709/219 |
| 2011/0191801 A1* | 8/2011 | Vytheeswaran | 725/34 |
| 2011/0246622 A1* | 10/2011 | Pantos et al. | 709/219 |
| 2011/0246623 A1* | 10/2011 | Pantos et al. | 709/219 |
| 2011/0246661 A1* | 10/2011 | Manzari et al. | 709/231 |
| 2011/0264530 A1* | 10/2011 | Santangelo et al. | 705/14.64 |
| 2011/0320300 A1* | 12/2011 | Broms et al. | 705/26.2 |
| 2012/0023522 A1* | 1/2012 | Anderson et al. | 725/35 |
| 2012/0030704 A1* | 2/2012 | Schiller et al. | 725/34 |
| 2012/0110620 A1* | 5/2012 | Kilar et al. | 725/34 |
| 2012/0116883 A1* | 5/2012 | Asam et al. | 705/14.58 |
| 2012/0137015 A1* | 5/2012 | Sun | 709/231 |
| 2012/0254365 A1* | 10/2012 | Adimatyam et al. | 709/219 |

OTHER PUBLICATIONS

Pantos, "HTTP Live Streaming", Internet Draft 00, Apple Inc., May 1, 2009.*

U.S. Appl. No. 61/386,913, filed Sep. 27, 2010.*

* cited by examiner

US 9,171,318 B2

VIRTUAL INSERTION OF ADVERTISEMENTS

BACKGROUND

Many of today's entertainment or communication-related electronic devices rely on receiving, transmitting, and/or using streaming digital data or content. For example, a set-top box may receive broadcast television programs and/or video-on-demand (VOD) that is streamed from a content provider. A personal computer may receive a stream of a video clip over the Internet. A soft phone may receive streaming audio data over a real-time transport protocol (RTP) link/channel that is established over an Internet Protocol (IP) network.

Advertisers can take advantage of the ease with which such digital data or content can be streamed to consumers by piggy-backing advertisements on the content or by splicing the advertisements and the content. Advertisements can be inserted into a video stream based on signals or cues that are associated with advertisement breaks within the video stream.

DETAILED DESCRIPTION

The following detailed description refers to the accompanying drawings. The same reference numbers in different drawings may identify the same or similar elements. As used herein, the term "content" may refer to audio and/or video content (e.g., a movie, a three-dimensional (3D) movie, show, television program, video stream, audio stream, Internet radio, broadcast of a live event (e.g., sporting event, concert, etc.)).

As described herein, when a system receives a content stream, the system may partition the stream into segments, generate a playlist indicating the order in which the segments are to be played, revise the playlist to include references to advertisements, and publish the revised playlist. A client/media player may play the segments and advertisements in accordance with the revised playlist.

Figure 1:
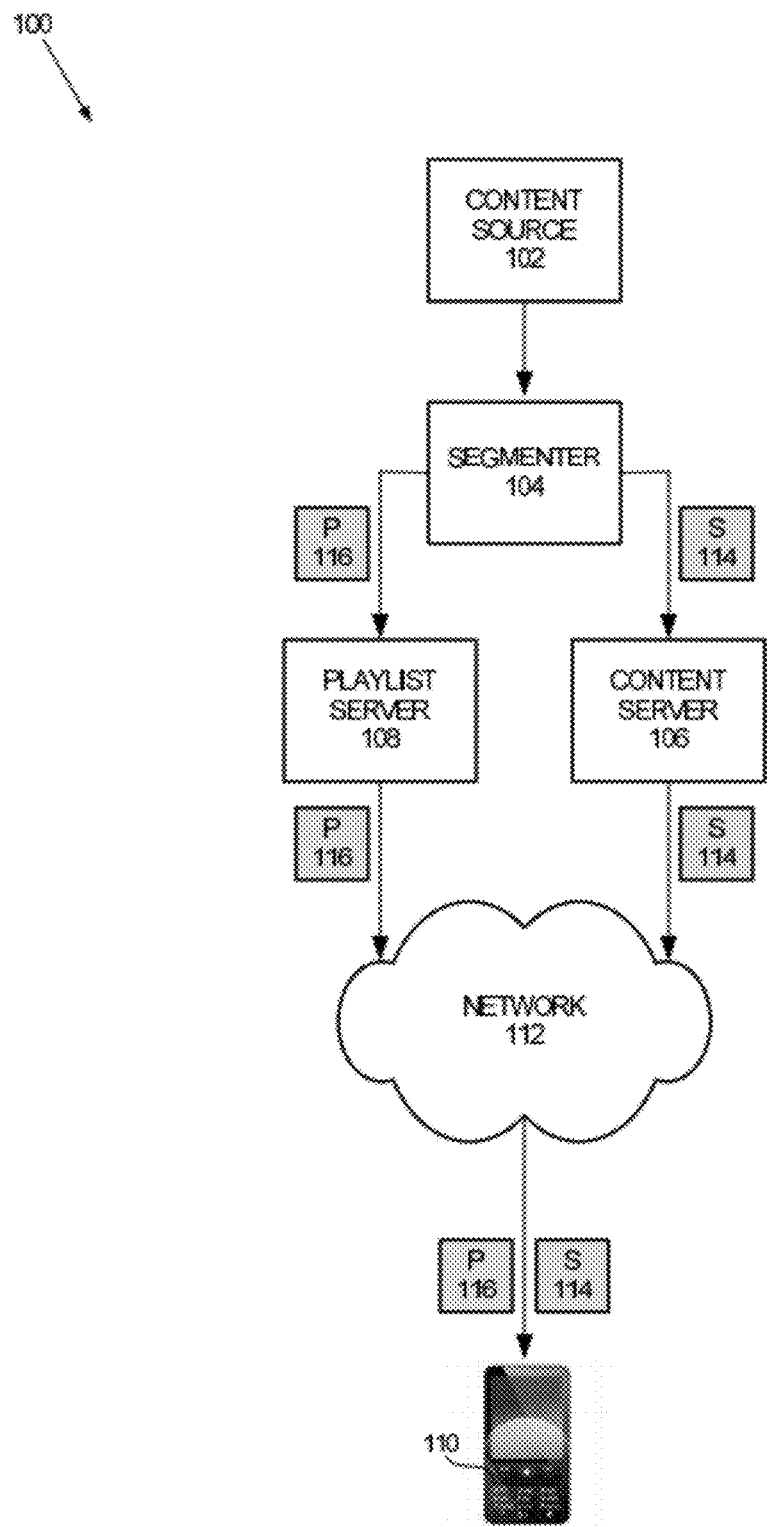
FIG. 1 illustrates an exemplary system for streaming content.
Figure 2:
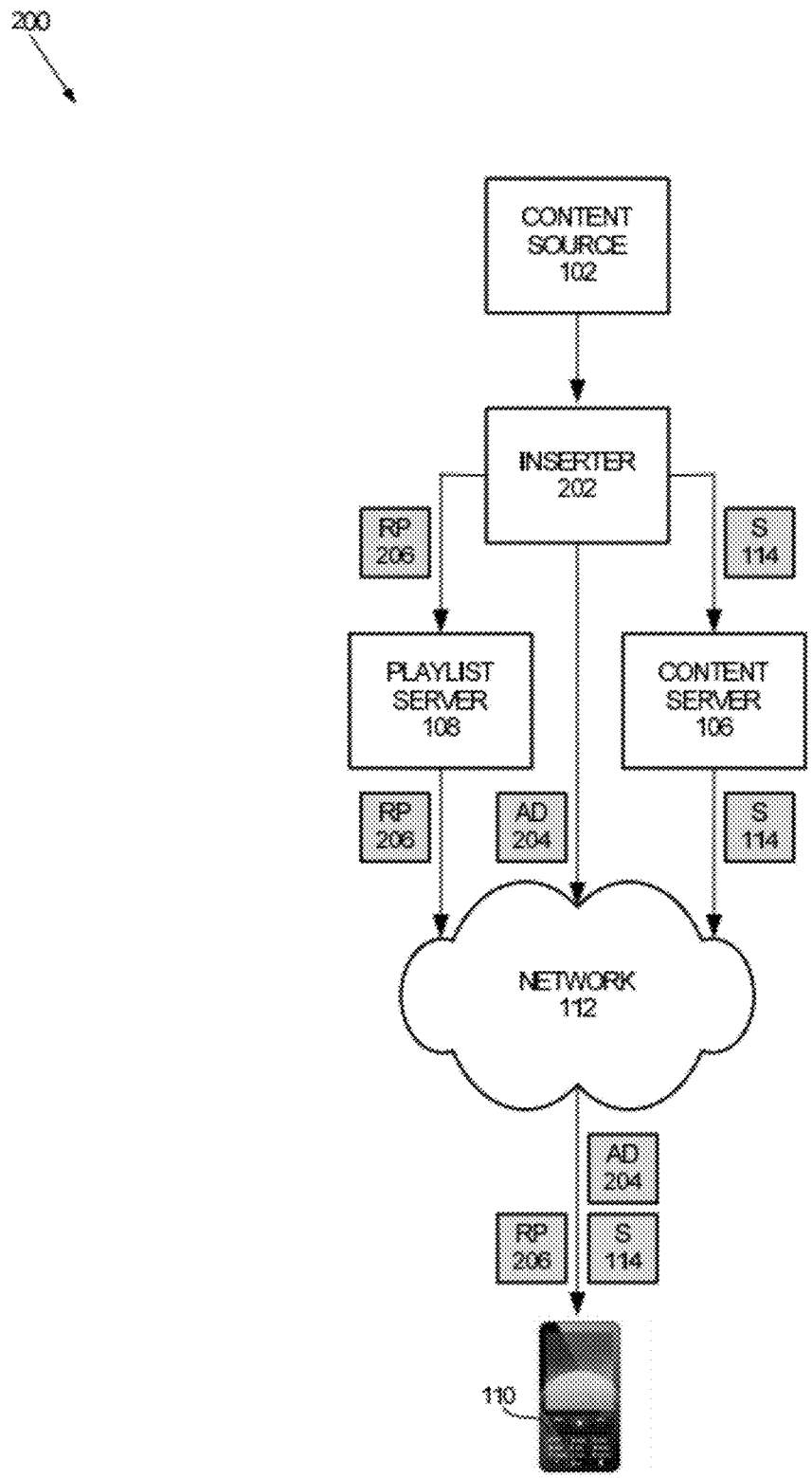
FIG. 2 is an overview of an exemplary system for virtually inserting advertisements in content streams.

FIGS. 1 and 2 illustrate concepts described herein. FIG. 1 illustrates an exemplary system 100 for streaming content over a network. As shown, system 100 may include a content source 102, segmenter 104, content server 106, playlist server 108, client devices 110, and network 112. These components/devices are described below in greater detail with references to FIGS. 3-9.

Briefly, segmenter 104 may split a content stream from content source 102 into segments, shown as content segments 114. In addition, segmenter 104 may generate a playlist 116 that indicates the order in which segments 114 are to be played. Segments 114 and playlist 116 may be distributed or served to client devices 110 via content server 106 and playlist server 108, respectively, over network 112. To obtain the content stream, client devices 110 may access playlist 116 as illustrated in FIG. 1. Client devices 110 may receive and play content segments 114 in accordance with the information provided in playlist 116.

In system 100, advertisements may be inserted in the content stream at content source 102, prior to the segmentation of the content stream at segmenter 104. Consequently, all downstream consumers of the content may receive the same advertisements.

FIG. 2 is an overview of an exemplary system 200 for virtually inserting advertisements in content streams. As shown, system 200 may include content source 102, inserter 202, content server 106, playlist server 108, client devices 110, and network 112. These components/devices are described below in greater detail with references to FIGS. 3-9.

Briefly, in system 200, inserter 202 performs a similar role as segmenter 104 in system 100. Like segmenter 104 in system 100, inserter 202 segments the content stream received from content source 102, generates content segments 114, and distributes/serves segments 114 to client devices 110 via content server 106 over network 112. However, in contrast to segmenter 104, inserter 202 obtains information identifying locations, in the content stream, at which advertisements 204 can be inserted. Inserter 202 uses this information to construct a revised playlist 206 that references content segments 114 and advertisements 204. Inserter 202 may provide/serve revised playlist 206 to client devices 110 via playlist server 108. Also, in contrast to segmenter 104, inserter 202 may provide/serve advertisements 204 to client devices over network 112.

In system 200, to receive the content stream (e.g., via an HTTP live stream), client devices 110 access or receive revised playlist 206. Consequently, client devices 110 may play content segments 114 and advertisements 204, in the sequence specified by revised playlist 206. To client devices 110, advertisements 204 and segments 114 may appear as if they are seamlessly spliced into a continuous stream. To client devices 110, advertisements 204 are "virtually" inserted in the content stream.

During the above virtual insertion, no modification of content files (e.g., files of content segments 114) and advertisement files (files of advertisements 204) takes place. Accordingly, inserter 202 may virtually merge segments 114 with advertisements 204 in a variety of combinations and permutations without creating and/or storing merged copies. This may save storage space.

In addition, unlike in system 100, in system 200, advertisements 204 do not need to be combined, for distribution, with the content stream at content source 102. This allows different advertisements to be delivered to different content consumer demographics based on the same content stream.

Figure 3:
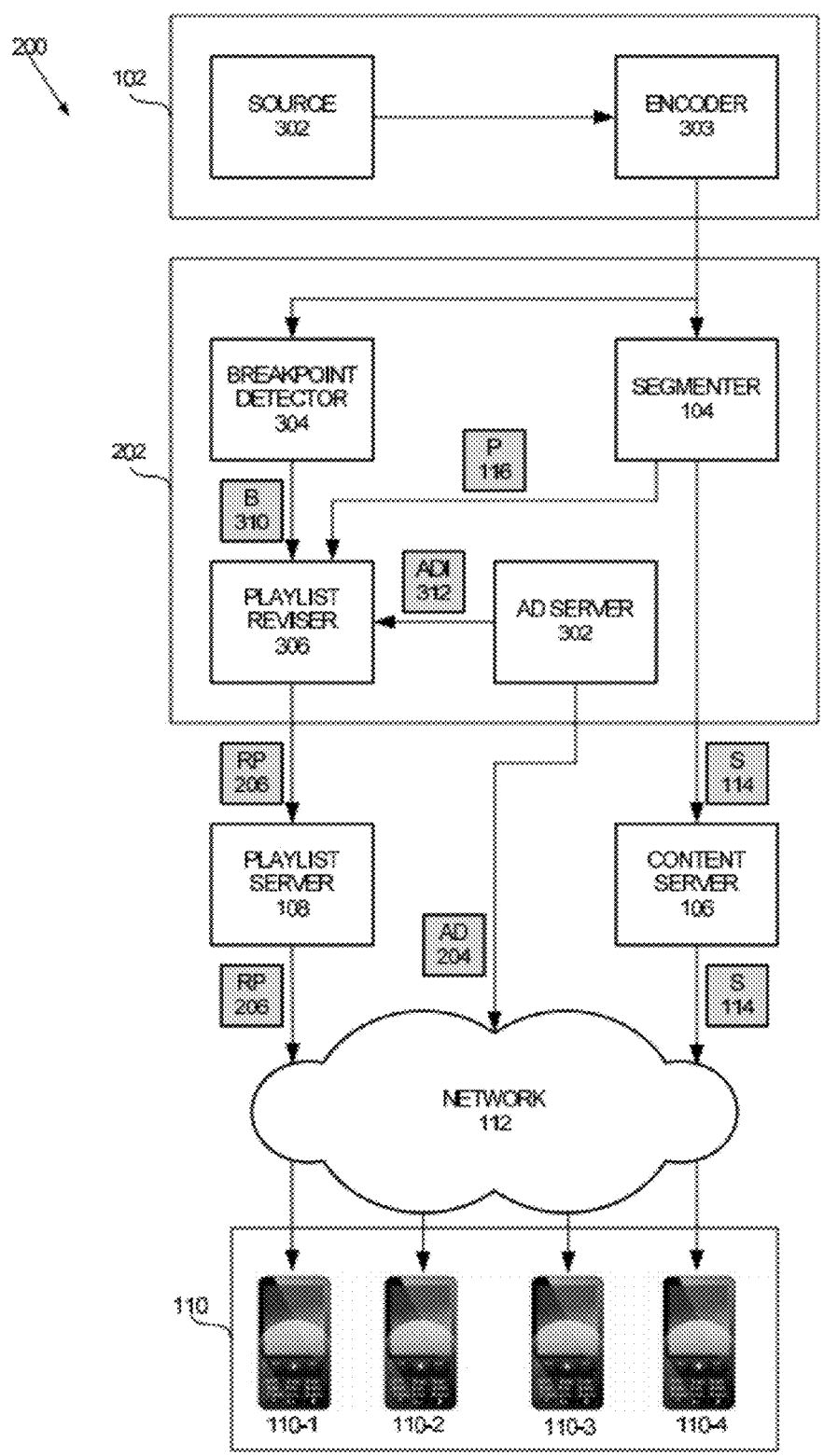
FIG. 3 is a detailed block diagram of the system of FIG. 2 according to one implementation.

FIG. 3 is a detailed block diagram of system 200. FIG. 3 shows content source 102, inserter 202, content server 106, playlist server 108, client devices 110, and network 112. Content source 102 provides a content stream to inserter 202. As further shown in FIG. 3, content source 102 may include source 302 and encoder 303. Source 302 may include a live or prerecorded audio or video source. Encoder 303 may receive a signal from source 302 and encode the media. The encoding may include a format such as, for example, H.264, MPEG-4 Advanced Video coding (AVC), high efficiency advanced audio coding (HE-AAC), etc. Encoder 303 may send the encoded media in a transport stream (e.g., MPEG-2) to inserter 202 and segmenter 104 for downstream processing.

Inserter 202 may stream virtually spliced advertisements 204 and a content stream received from content source 102 to client devices 110. Inserter 202 may provide a revised playlist 206 that specifies a sequence of advertisements 204 and content segments 114. As shown, inserter 202 may include segmenter 104, advertisement (AD) server 302, breakpoint detector 304, and playlist reviser 306. Depending on the implementation, inserter 202 may include additional, fewer, or different components than those illustrated in FIG. 3.

Segmenter 104 may divide the content stream into small files (segments 114) that can be reassembled into a stream. In one implementation, segmenter 104 may produce files of equal length/size. In other implementations, segmenter 104 may split the stream into files of varying lengths. In some instances, file sizes may be capped at a threshold.

Segmenter 104 may also output an index file or a playlist 116 that lists storage locations (e.g., Universal Resource Locator (URL) or Universal Resource Identifier (URI), network addresses, etc.) of segments 114 in the order that segments 114 are to be reassembled or played at client devices 110. Examples of index/playlist files may include M3U8 files, M3U files, PLS files, Advanced Stream Redirector (ASX) files, etc.

Figure 4A:
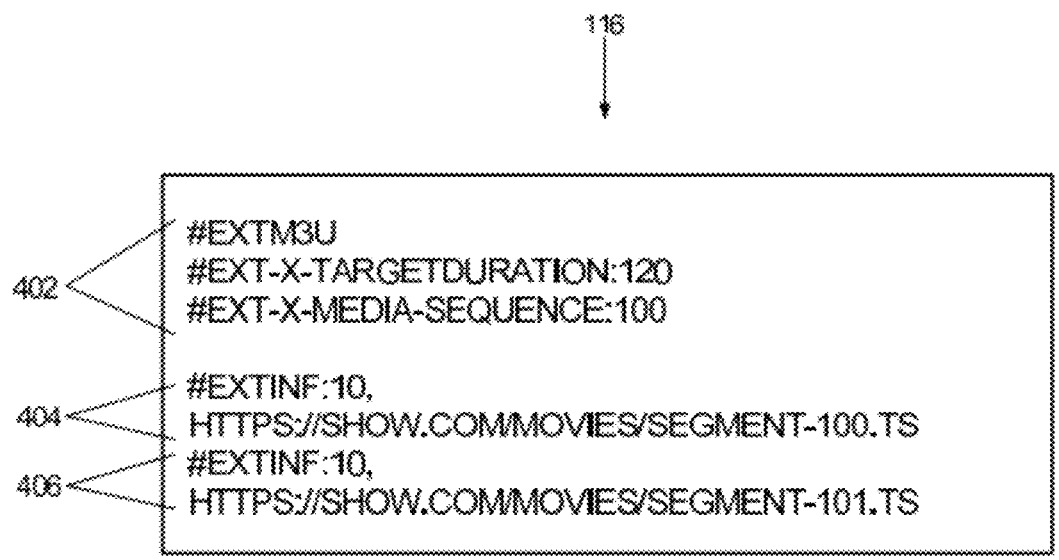
FIG. 4A illustrates an exemplary playlist of FIG. 3.

FIG. 4A shows an exemplary playlist 116. As shown, playlist 116 may include header 402 and segment identifiers 404 and 406. Playlist 116 is depicted for simplicity and does not include many components that may be present in other playlist files (e.g., M3U8 files).

As shown, header 402 includes a #EXTM3U statement, #EXT-X-TARGETDURATION statement, and #EXT-X-MEDIA-SEQUENCE statement. #EXTM3U indicates the type of playlist/index file (e.g., extension to M3U). #EXT-X-TARGETDURATION indicates the maximum duration of segments in playlist 116. In FIG. 4A, the maximum duration is shown as 120 seconds.

EXT-X-MEDIA-SEQUENCE indicates a minimum sequence number of any file (i.e., segment) in playlist 116. For example, in FIG. 4A, the minimum number is specified as 100. In segment identifiers 404 and 406, the actual the sequence numbers are 100 and 101 in strings HTTPS://SHOW.COM/MOVIES/SEGMENT-100.TS and HTTPS://SHOW.COM/MOVIES/SEGMENT-101.TS.

Each of segment identifiers 404 and 406 includes a #EXTINF statement and a string (e.g., URL or URI). #EXTINF indicates the duration of the content segment. The string identifies a location of the segment.

Returning to FIG. 3, as segmenter 104 receives the content stream, segmenter 104 may continue to update playlist 116 by appending it with new segment identifiers and send the updated playlists 116 to playlist reviser 306. That is, given the content stream, segmenter 104 may send a stream of playlists 116 to playlist reviser 306.

AD server 302 may store advertisements 204 and AD information (ADI) 312. AD server 302 may provide the advertisements 204 to client devices 110 over network 112 and AD information 312 to playlist reviser 306. AD information 312 may include, for example, a network address at which a corresponding advertisement is stored, description of the advertisement, the duration of the advertisement, the resolution of the advertisement, target demographics, types of content with which the advertisement may be combined, etc.

Breakpoint detector 304 may receive the content stream from content source 102, and may determine advertisement breakpoints in the stream. Break point detector 304 may send timing information (breakpoints 310) identifying the locations of the detected breakpoints, within the content stream, to playlist reviser 306. In one implementation, breakpoint detector 304 may include a Digital Program Insertion (DPI) monitor that analyzes cue tones embedded in the content stream. The cue tones may indicate how and when to trigger advertisement insertions.

Playlist reviser 306 may obtain, as input, playlist 116 from segmenter 104, breakpoints 310 from breakpoint detector 304, and AD information 312 from AD server 302. Based on the input, playlist reviser 314 may generate a revised playlist (RP 206), and send revised playlist 206 to playlist server 108.

In one implementation, in revising the playlist, playlist reviser 306 may determine the particular content segment in which one of breakpoints 310 occurs. Next, playlist reviser 306 may determine identities (e.g., network addresses, URLs, URIs, etc.) of advertisements that may be inserted at the breakpoint, and insert, in playlist 116, the identities of the advertisements immediately after the determined segment identifier, to obtain playlist 206.

Figure 4B:
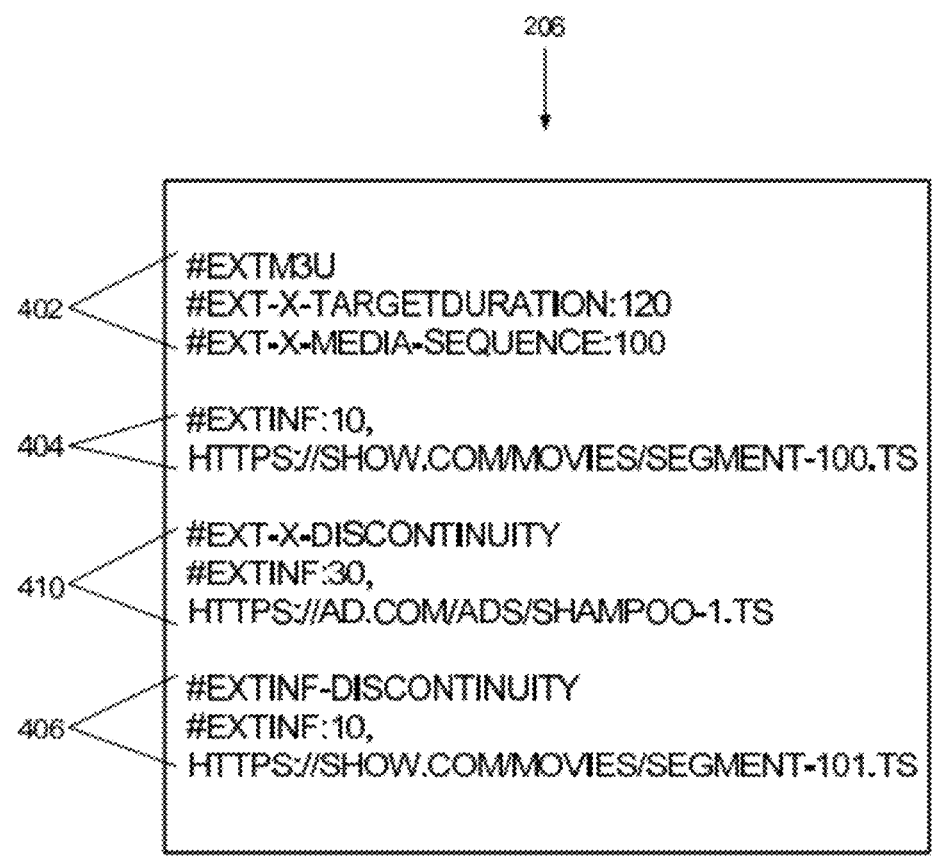
FIG. 4B illustrates an exemplary revised playlist of FIG. 3.

For example, FIG. 4B illustrates a revised playlist 206 that may be obtained from playlist 116 of FIG. 4A. Assume that playlist reviser 306 has received playlist 116 as shown in FIG. 4A and that breakpoints 310 indicate that an advertisement breakpoint occurs at 1005 seconds into the movie being streamed by content source 102 (i.e., in the $101^{st}$ segment). In addition, assume that playlist reviser 306 has determined, based on AD information 312, that HTTPS://AD.COM/ADS/SHAMPOO-1.TS is to be inserted at the breakpoint. In such a case, playlist reviser 306 may insert a segment identifier 410 for the advertisement after segment identifier 404 for $101^{st}$ segment, as illustrated in FIG. 4B. The "EXT-X-DISCONTINUITY" tag in segment identifier 410 indicates that the segment designated by the URI/URL immediately following the tag may have a different format than the segment identified by the preceding segment identifier (e.g., segment identifier 404).

Figure 5A:
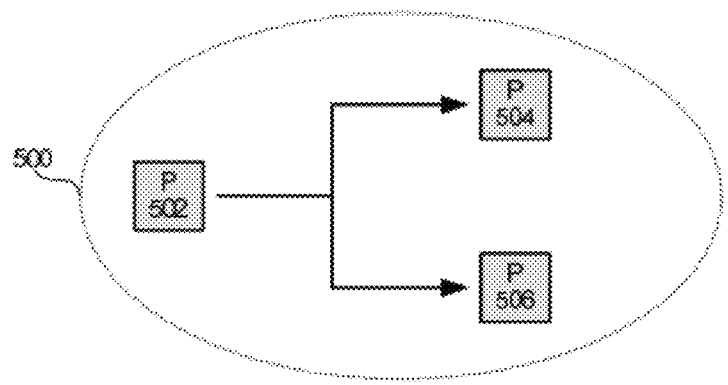
FIG. 5A illustrates an exemplary playlist tree.

In some implementations, playlist 116 (e.g., playlist 116 in a stream of playlists 116) may include a tree of playlist files. In these implementations, playlist reviser 502 may revise and generate a revised playlist tree that corresponds to the playlist tree 116. FIG. 5A shows an exemplary playlist tree 500. As shown, playlist tree 500 may include a root playlist 602 and leaf playlists 604 and 606. In other implementations, playlist tree 500 may include additional playlists.

Figure 5B:
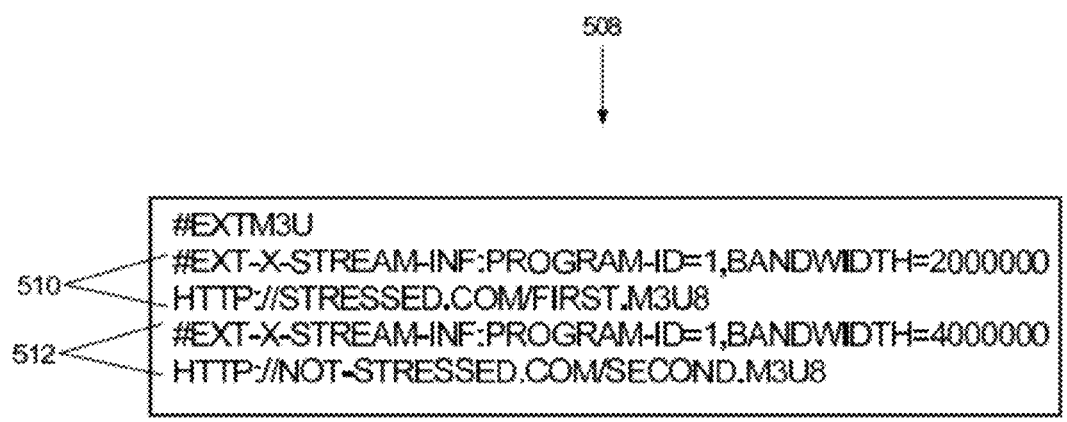
FIG. 5B illustrates an exemplary conditional playlist of FIG. 5A.

Root playlist 502 may include a conditional playlist. FIG. 5B illustrates an exemplary conditional playlist 508. As shown, conditional playlist 508 may include conditional statements 510 and 512. Each of conditional statements 510 and 512 may include a URL/URI to another playlist (e.g., playlist 504 or 506) that may be scanned and used by client devices 110 when the condition specified in the conditional statement is satisfied. For example, conditional statement 510 specifies that if the available bandwidth for receiving the content stream is 200,000 (e.g., 200 kbps), client devices 110 may scan download a leaf playlist identified by the URL HTTP://STRESSED.COM/FIRST.M3U8, which is playlist 504. When a client device processes playlist 504 identified by the URL, client devices 110 may obtain content segments 114 that are listed in playlist 504.

Returning to FIG. 3, content server 106 may receive segments 114 from segmenter 104 and provide segments 114 to client devices 110. In some implementations or configurations, as content server 106 receives segments, content server 106 may remove a number of older segments that were received earlier. In these implementations, content server 106 may retain segments that were received in a time window and serve such segments to client devices 110.

Playlist server 108 may receive revised playlists 206 from playlist reviser 306 and provide revised playlists 206 to client devices 106 over network 112. For a live content stream, playlist server 308 may continue to update the revised playlists 206 from playlist reviser 306, until the content stream terminates.

Client devices 110 may include devices 110-1 through 110-4 (individually client device 110). Each client device 110 may include a handset, cellular phone, personal computer, laptop computer, tablet computer, set-top box, gaming console, personal digital assistant (PDA), and/or another type of communication and/or computational device that is capable of playing multimedia content. Client device 110 may download or receive a sequence of revised playlists 206, and based on revised playlists 206, may obtain content segments 114 and advertisements 204 from content server 106 and AD server 302, respectively. In FIG. 3, although client devices 110 are shown as including only 110-1 through 110-4, in an actual implementation, client devices 110 may include many more devices (e.g., 1,000, 10,000, 100,000, etc.). In addition, each of client devices 110 may receive the same or different revised playlists 206 than those received by other client devices 110.

Network 112 may include one or more wired and/or wireless networks that are capable of exchanging information, such as voice, video, documents, multimedia, text, etc. and capable of delivering content from one network element to another network element. For example, network 112 may include one or more public switched telephone networks (PSTNs) or another type of switched network. Network 112 may also include a number of transmission towers for receiving wireless signals and forwarding the signals toward the intended destination. Network 112 may further include one or more packet switched networks, such as an Internet protocol (IP) based network, a local area network (LAN), a wide area network (WAN), a personal area network (PAN), an intranet, the Internet, or another type of network that is capable of exchanging information.

Depending on the implementation, system 200 may include additional, fewer, or different components than those illustrated in FIG. 3. For example, in one implementation, system 200 may include additional content sources 102, inserters 202, client devices 110, etc. Furthermore, although not illustrated in FIG. 3, in an actual implementation, system 200 may include different network components, such as switches, bridges, routers, gateways, firewalls, different types of client/server devices, etc.

In addition, depending on the implementation, one or more of the component shown in FIG. 3 may be implemented as software, hardware, and/or a combination of hardware and software. For example, in one implementation, encoder 303 and breakpoint detector 304 may be implemented via off-the-shelf hardware devices. In another example, segmenter 104, AD server 302, content server 106, and playlist server 108 may be implemented as components of one or more application servers. In yet another example, components 104-108 and 302-306 may be implemented as scripts and/or programs in combination with web servers.

Figure 6:
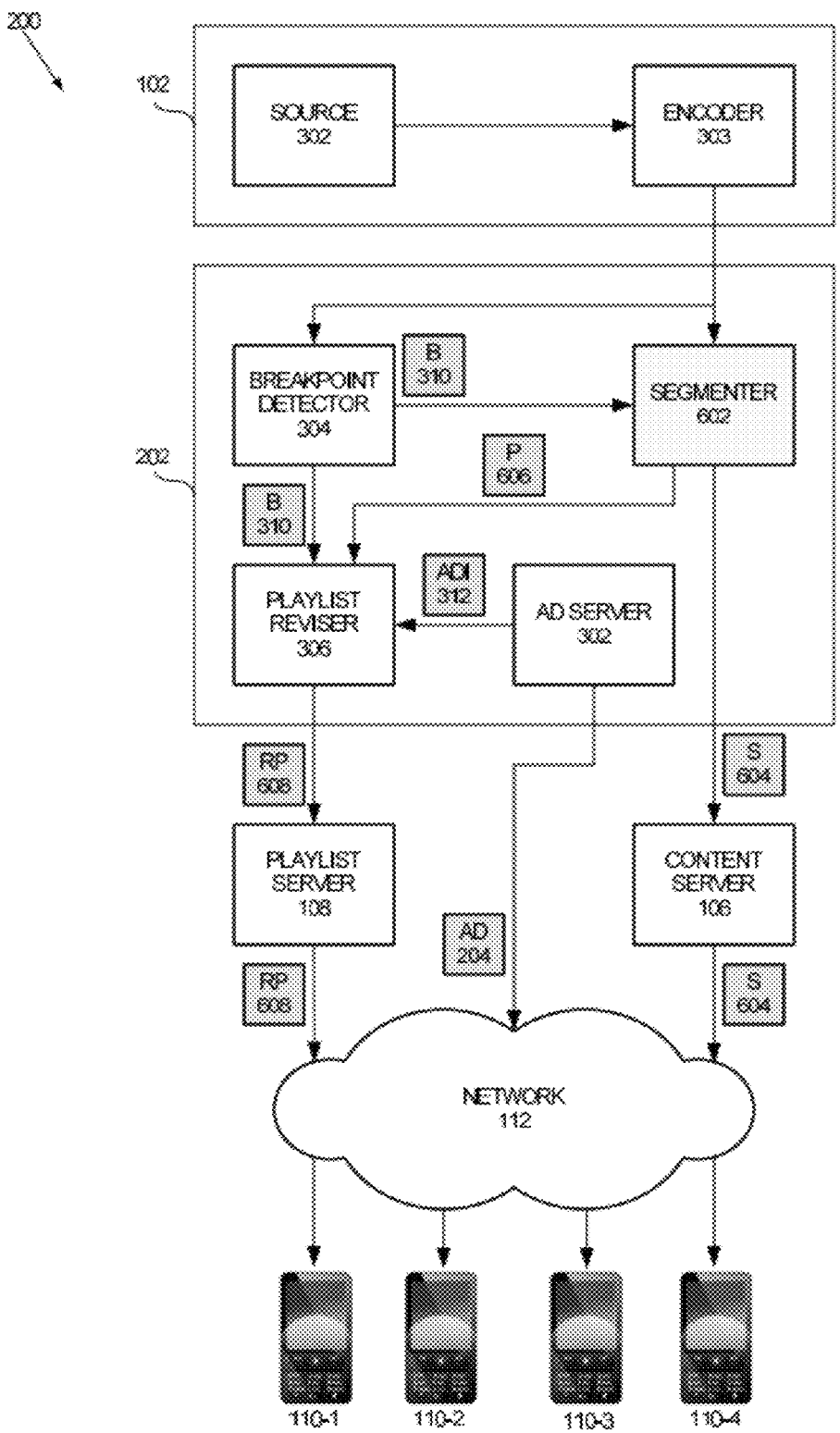
FIG. 6 is a detailed block diagram of an exemplary system of FIG. 2 according to another implementation.

FIG. 6 is a detailed block diagram of an exemplary system of FIG. 2 according to another implementation. In contrast to FIG. 3, segmenter 602 in FIG. 6 receives breakpoints 310 from breakpoint detector 304, and generates segments 604 that are synchronized to breakpoints 310. For example, assume that a breakpoint occurs at 15 minutes and 5 seconds from the start of a movie. Also assume that segmenter 602 generates 10 second segments during the first fifteen minutes and then generates a 5 second segment. Accordingly, the next segment in segments 604 may begin exactly at the breakpoint. Segmenter 602 may output playlist 606 that corresponds to synchronized segments 604.

Playlist reviser 306 in FIG. 6 may operate similarly as playlist 306 in FIG. 3, except than that playlist 306 in FIG. 6 receives playlist 606 rather than playlist 116 and outputs revised playlist 608 in place of revised playlist 206. Revised playlist 608 includes a list of segments 604 in place of segments 114.

In FIG. 6, as the consequence of segmenter 602 outputting playlist 608, client devices 110 may play advertisements 204 exactly at or close to a breakpoint. Returning to the previous example, in revised playlist 608, an advertisement may be listed immediately following the identifier for the 5-second segment. In system 200 of FIG. 3, assuming that segmenter 104 splits the content stream into 10-second segments (e.g., FIG. 4A), the advertisement would follow a 10-second segment. In this case, because a breakpoint occurs 5 seconds into the 10 second segment, client device 110 may wait 5 seconds until the segment terminates, before playing the advertisement.

Figure 7:
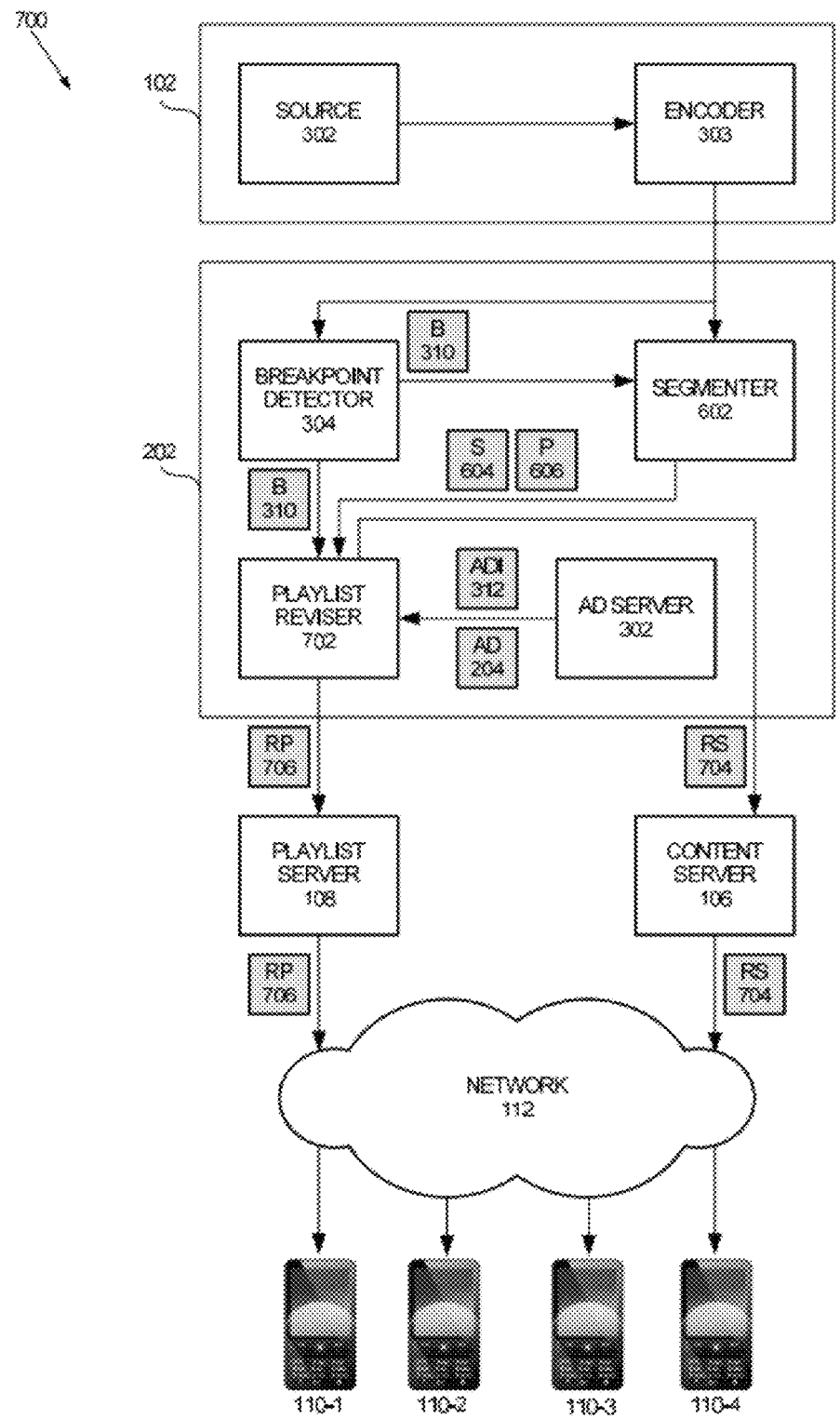
FIG. 7 is a detailed block diagram of an exemplary system of FIG. 2 according to yet another implementation.

FIG. 7 is a detailed block diagram of an exemplary system of FIG. 2 according to yet another implementation. In contrast to FIG. 6, segmenter 602 in FIG. 7 sends both synchronized segments 604 and playlist 606 to playlist reviser 702. In addition, AD server 302 sends both advertisements 204 and AD information 312 to playlist reviser 702.

In contrast to playlist reviser 306 in FIG. 6, playlist reviser 702 may rename received synchronized segments 604 and advertisements 204 and forwards the renamed segments and advertisements 704 to content server 106. Content server 106 may serve renamed segments and advertisements 704 to client devices 110. In addition, playlist reviser 702 may output revised playlist 706 that describes renamed segments and advertisements 704 to playlist server 108.

Figure 8:
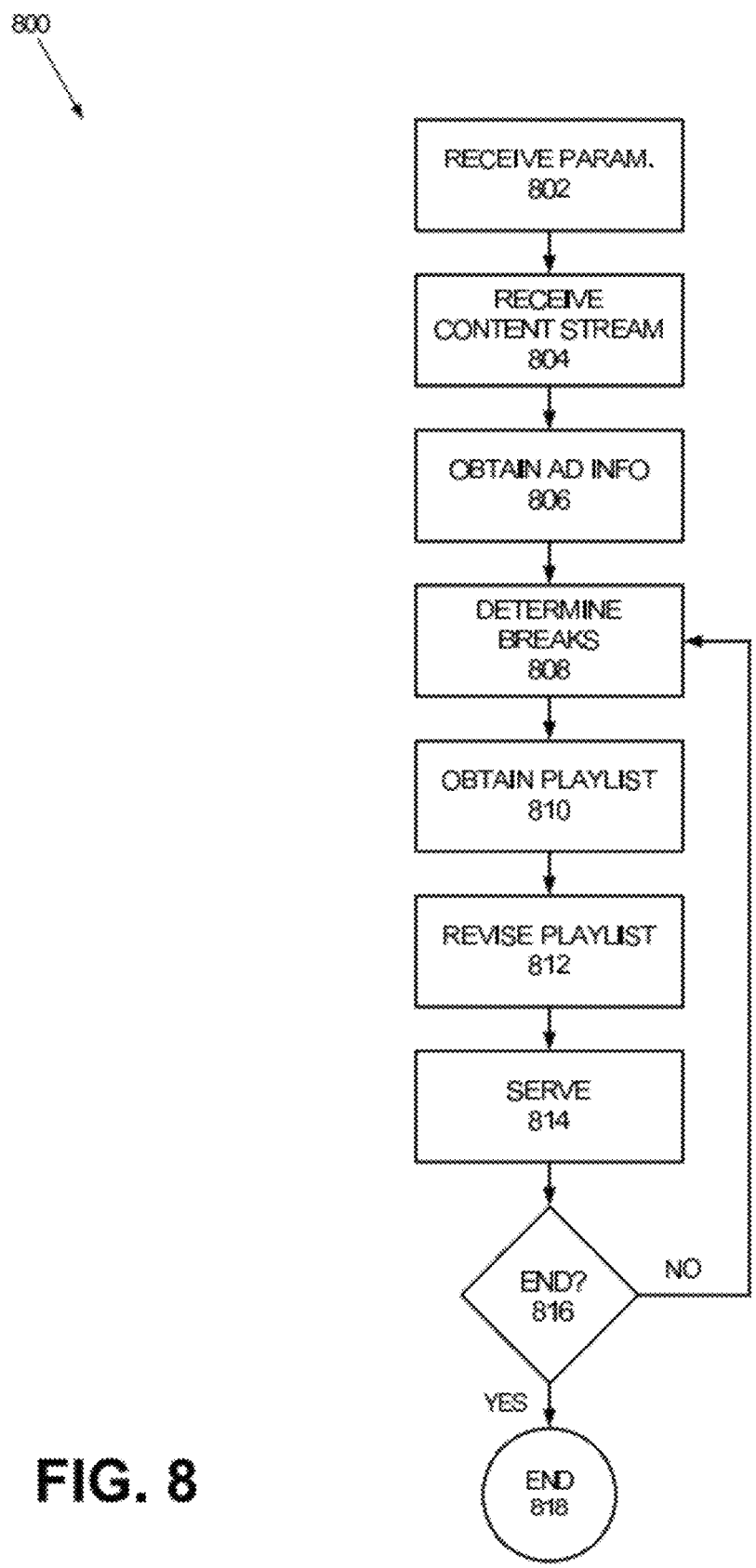
FIG. 8 is a flow diagram of an exemplary process associated with virtually inserting advertisements.

FIG. 8 is a flow diagram of an exemplary process 800 that is associated with virtually inserting advertisements. As shown, process 800 may include receiving input parameters (block 802). The input parameters may specify advertisements to be inserted into a content stream, the size of segments into which a content stream may be divided, the address (e.g., domain name) of content server 106 and directory to which the content stream may be forwarded from segmenter 104/602, the address of playlist server 108, etc. In some implementations, the parameters may also specify an encoding scheme to be used by encoder 303, the format of the content, etc.

Segmenter 104/602 and breakpoint detector 304 may receive a content stream from content source 102 (block 804). In some implementations, playlist reviser 306 may also receive metadata that is associated with the content stream. As described above, in one implementation, the content stream may have been sent as a MPEG-2 Transport Stream. Upon receiving the content stream, segmenter 104/602 may partition the content stream into segments 114/604, and send segments 114/604 to content server 106. In addition, segmenter 104/602 may send playlist 116/606 that describes segments 114/604 to playlist reviser 306.

Playlist reviser 306 may receive AD information 312 (block 806). In one implementation, playlist reviser 306 may receive AD information 312 from AD server 302. AD server 302 may have sent AD information 312 in response to a request from playlist server 306 for a candidate list of advertisements that can be shown, based on metadata associated with the content stream.

Breakpoint detector 304 may determine breaks in the content stream received from content source 102 (block 808). As described above, in one implementation, breakpoint detector 304 may include a DIP monitor that determines advertisement breakpoints based on digital cue tones in the content stream. Upon determining breakpoints 310, breakpoint detector 304 may send breakpoints 310 to playlist reviser 306 and/or segmenter 104/602.

Playlist reviser 306 may obtain playlist 116/606 from segmenter 104/602 (block 810). Furthermore, playlist reviser 306 may generate revised playlist 206/608 based on the metadata associated with the content stream, breakpoints 310 from breakpoint detector 304, playlist 116/606 from segmenter 104/602, and AD information 312 from AD server 302 (block 812). For example, assume that the metadata indicates that the content stream is intended for family viewing, and AD information 312 lists two 30 second advertisements that may be inserted into a 1 minute advertisement break. Accordingly, playlist reviser 306 may incorporate segment identifiers that correspond to the 30 second advertisements into revised playlist 206/608.

Playlist reviser 306 may send revised playlist 206/608 to playlist server 108 (block 814). When client device 110 wishes to play the content stream, client device 110 may access revised playlist 206/608 on playlist server 108.

If playlist reviser 306 and/or segmenter determine that the content stream has ended (block 816—YES), process 800 may terminate (circle 818). Otherwise (block 816—NO), process 800 may return to block 808, to continue to process the content stream.

Figure 9:
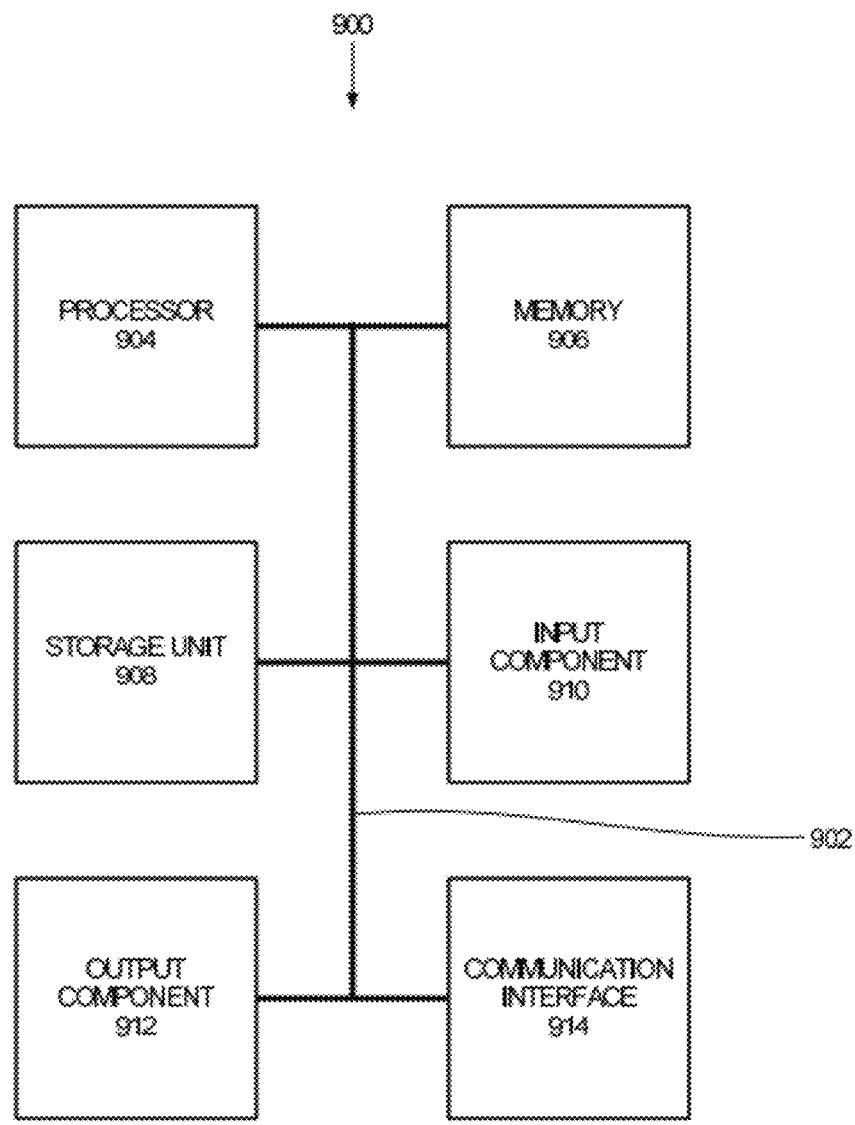
FIG. 9 is a block diagram of one or more devices on which the system of FIG. 2 may be implemented.

FIG. 9 is a block diagram of an exemplary network device 900. Network device 900 may correspond to one or more of devices on which components in FIGS. 3, 6, and/or 7 may be implemented. Referring to FIG. 9, network device 900 may include bus 902, processor 904, memory 906, storage unit 908, input component 910, output component 912, and communication interface 914. Bus 902 may include a path that permits communication among the elements of network device 900.

Processor 904 may include a processor, a microprocessor, an Application Specific Integrated Circuit (ASIC), a Field Programmable Gate Array (FPGA), and/or other processing logic (e.g., embedded devices) capable of controlling network device 900. Memory 906 may include static memory, such as read only memory (ROM), and/or dynamic memory, such as random access memory (RAM), or onboard cache, for storing data and machine-readable instructions (e.g., programs, scripts, etc.). Storage unit 908 may include a floppy disk, CD ROM, CD read/write (R/W) disc, and/or flash memory, as well as other types of storage devices (e.g., hard disk drive) for storing data and/or machine-readable instructions (e.g., a program, script, etc.). Depending on the context, the term "memory," "storage," "storage device," and/or "storage unit" may be used interchangeably. For example, a "computer-readable storage device" may refer to both a memory and/or storage device.

Input component 910 may permit a user to input information to network device 900. Input component 910 may include, for example, a keyboard, a keypad, a mouse, a pen, a microphone, a touch screen, voice recognition and/or biometric mechanisms, etc. Output component 912 may include a mechanism that outputs information to the user. Output component 912 may include, for example, a display, a printer, a speaker, etc. In some implementations, because network device 900 may operate as a server device, network device 900 may include a minimal number of input components 910 and output components 912 (e.g., a keyboard and/or a console), to minimize cost and to increase robustness.

Communication interface 914 may include a transceiver (e.g., a transmitter or receiver) for network device 900 to communicate with other devices and/or systems. For example, via communication interface 914, network device 900 may communicate over a network, such as the Internet, an intranet, a terrestrial wireless network (e.g., a WLAN, WiFi, WiMax, etc.), a satellite-based network, optical network, etc. Communication interface 914 may also include a modem, an Ethernet interface to a LAN, and/or another interface.

In the above, when system 200 receives a content stream, system 200 may partition the stream into segments, generate a playlist indicating the order in which the segments are to be combined or played, revise the playlist to include references to advertisements, and publish the revised playlist. A client/media player may play the segments and advertisements in accordance with the revised playlist.

In system 200, during the virtual insertion, no modification of content files (e.g., files of content segments 114) and advertisement files (files for advertisements 204) takes place. Accordingly, inserter 202 may virtually merge the segments with the advertisements in a variety of combinations and permutations without creating and/or storing merged copies of the content and advertisements. This may save storage space.

In addition, in system 200, advertisements 204 do not need to be combined, for distribution, with the content stream at content source 102. This allows different advertisements to be delivered to different content consumer demographics based on the same content stream.

The foregoing description of implementations provides illustration, but is not intended to be exhaustive or to limit the implementations to the precise form disclosed. Modifications and variations are possible in light of the above teachings or may be acquired from practice of the teachings.

In addition, while series of blocks have been described with regard to an exemplary process illustrated in FIG. 8, the order of the blocks may be modified in other implementations. In addition, non-dependent blocks may represent acts that can be performed in parallel to other blocks.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A system comprising:
    a device to:
        receive a playlist that lists segments of a content stream in an order the segments must be recombined to generate a copy of the content stream;
        receive advertisement information for advertisements, wherein the advertisement information does not include the advertisements;
        receive timing information, which identifies an advertisement breakpoint in the content stream, from a breakpoint detector that obtains the timing information, which is carried by a signal provided in the content stream, from the signal;
        without sending the playlist over a network to a client and without sending the playlist over the network to a remote device,
            revise the playlist to generate a revised playlist that lists the segments and the advertisements based on the advertisement information and the timing information that identifies the advertisement breakpoint in the content stream; and
        send, over the network, the revised playlist to at least one of:
            the remote device or the client.

2. The system of claim 1, wherein the remote device includes at least one of:
    an application server; or a web server.

3. The system of claim 1, further comprising:
    a segmenter that splits the content stream into the segments.

4. The system of claim 3, wherein the segmenter is configured to:
    split the content stream into the segments, the segments being files of an equal size.

5. The system of claim 1, further comprising:
    a content source that sends the content stream to the device.

6. The system of claim 1, wherein the playlist includes:
    one or more M3U8 files.

7. The system of claim 1, wherein when the device generates the revised playlist, the device is further configured to:
    select the advertisements based on information pertaining to the content stream.

8. The system of claim 1, wherein the breakpoint detector includes:
    a Digital Program Insertion (DPI) monitor that generates the timing information based on the signal provided in the content stream, wherein the signal includes digital cue tones.

9. The system of claim 1, further comprising:
    an advertisement server that sends the advertisement information to the device and provides the advertisements to the client.

10. The system of claim 9, wherein the client includes one or more of:
    a tablet computer; personal computer; laptop computer; smart phone; cell phone; personal digital assistant; gaming console; or a browser.

11. The system of claim 1, wherein the revised playlist includes:
    a list of identifiers of the segments, the identifiers interleaved with identifiers of the advertisements.

12. The system of claim 11, wherein the identifiers of the segments include:
    a universal resource locator (URL) or a universal resource identifier (URI) associated with each of the segments.

13. The system of claim 1, wherein the content stream comprises a stream formatted in accordance with:
    H.264;
    MPEG-4 Advanced Video Encoding (AVC); or
    high efficiency advanced audio coding (HE-AAC).

14. The system of claim 1, further comprising one or more of:
    a content source that generates the content stream and provides the content stream to the device and a segmenter;
    the segmenter, which splits the content stream into the segments and outputs the segments and the playlist;
    the remote device;
    a content server that stores the segments received from the segmenter; or
    an advertisement server that stores the advertisements and sends the advertisement information to the device.

15. A method comprising:
    receiving a playlist that lists segments of a content stream in an order the segments must be recombined to generate a copy of the content stream;
    receiving advertisement information for advertisements, wherein the advertisement information does not include the advertisements;
    receiving timing information, which identifies an advertisement breakpoint in the content stream, from a breakpoint detector that obtains the timing information, which is carried by a signal provided in the content stream, from the signal;
    without sending the playlist over a network to any client and without sending the playlist over the network to a remote server,
        revising the playlist to generate a revised playlist that lists the segments and the advertisements based on the advertisement information and the timing information that identifies the advertisement breakpoint in the content stream; and
    sending, over the network, the revised playlist to the remote server.

16. The method of claim 15, further comprising:
    receiving the content stream from an encoder device.

17. The method of claim 15, further comprising:
    obtaining the timing information that identifies the advertisement breakpoint in the content stream by analyzing digital cue tones embedded in the content stream.

18. The method of claim 17, further comprising:
    partitioning the content stream into files of an equal size.

19. The method of claim 15, further comprising:
    repeating, until the content stream terminates, the receiving a playlist, receiving advertisement information, receiving timing information that identifies an advertisement breakpoint, generating a revised playlist, and sending the revised playlist to the remote server.

20. The system of claim 1, further comprising:
    a segmenter that splits the content stream into the segments, wherein the device receives the playlist from the segmenter and wherein the segmenter is configured to:
    receive the timing information from the breakpoint detector; and
    use the timing information to set a length of one segment, among the segments, such that the one segment ends at the advertisement breakpoint.

21. The system of claim 1, wherein one of the segments ends at the advertisement breakpoint.

22. The system of claim 1, wherein the advertisement information includes a network address of one of the advertisements and a duration of the one of the advertisements.

23. The method of claim 15, wherein one of the segments ends at the advertisement breakpoint.

24. The method of claim 15, wherein the advertisement information includes a network address of one of the advertisements and a resolution of the one of the advertisements.

25. A method comprising:
  obtaining a first playlist that lists segments of a content stream in an order the segments must be recombined to generate a copy of the content stream;
  obtaining advertisement information for an advertisement, wherein the advertisement information does not include the advertisement;
  obtaining timing information, which identifies an advertisement breakpoint in the content stream, from a breakpoint detector that obtains the timing information, which is carried by a signal provided in the content stream, from the signal;
  without sending the playlist over a network to any client and without sending the playlist over the network to a remote device,
    revising the first playlist to generate a revised playlist that lists the segments and the advertisement based on the advertisement information and the timing information that identifies the advertisement breakpoint in the content stream; and
    sending, over the network, the revised playlist to the remote device.

26. The method of claim 25, wherein one of the segments ends at the advertisement breakpoint.

27. The method of claim 25, wherein the advertisement information includes a network address of the advertisement, and identifies a target demographics of the advertisement.

28. One or more non-transitory computer-readable media, comprising computer-executable instructions that, when executed by one or more processors, cause the one or more processors to:
  obtain a first playlist that lists segments of a content stream in an order the segments must be recombined to generate a copy of the content stream;
  obtain advertisement information for an advertisement, wherein the advertisement information does not include the advertisement;
  obtain timing information, which identifies an advertisement breakpoint in the content stream, from a breakpoint detector that obtains the timing information, which is carried by a signal provided in the content stream, from the signal;
  without sending the playlist over a network to any client and without sending the playlist over the network to a remote device,
    revise the first playlist to generate a revised playlist that lists the segments and the advertisement based on the advertisement information and the timing information that identifies the advertisement breakpoint in the content stream; and
    sending, over the network, the revised playlist to the remote device.

29. The one or more non-transitory computer-readable media of claim 28, wherein one of the segments ends at the advertisement breakpoint.

30. The one or more non-transitory computer-readable media of claim 28, wherein the advertisement information includes a network address of the advertisement and identifies types of content into which the advertisement is to be inserted.

\* \* \* \* \*